United States Patent
Dussaume et al.

(10) Patent No.: US 12,057,890 B2
(45) Date of Patent: Aug. 6, 2024

(54) METHOD FOR VALIDATING A TRANSACTION DURING A RADIO COMMUNICATION

(71) Applicant: Orange, Issy-les-Moulineaux (FR)

(72) Inventors: Philippe Dussaume, Chatillon (FR); Jean-Philippe Javaudin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/469,062

(22) Filed: Sep. 18, 2023

(65) Prior Publication Data

US 2024/0031038 A1  Jan. 25, 2024

Related U.S. Application Data (62) Division of application No. 17/770,852, filed as application No. PCT/FR2020/051747 on Oct. 6, 2020.

(30) Foreign Application Priority Data

Oct. 24, 2019 (FR) ........................................ 1911945

(51) Int. Cl.
*H04B 13/00* (2006.01)
(52) U.S. Cl.
CPC .................................. *H04B 13/005* (2013.01)
(58) Field of Classification Search
CPC .................................................... H04B 13/005
See application file for complete search history.

(56) References Cited

U.S. PATENT DOCUMENTS

| | | | |
|---|---|---|---|
| 5,870,391 A | * | 2/1999 | Nago ..................... H04B 1/713 370/503 |
| 10,693,526 B2 | | 6/2020 | Levionnais et al. |

(Continued)

FOREIGN PATENT DOCUMENTS

| | | |
|---|---|---|
| WO | 2012131224 A1 | 10/2012 |
| WO | 2016001506 A1 | 1/2016 |

(Continued)

OTHER PUBLICATIONS

International Search Report dated Jan. 13, 2021 for corresponding International Application No. PCT/FR2020/051747, Oct. 6, 2020.

(Continued)

*Primary Examiner* — Hsinchun Liao
(74) *Attorney, Agent, or Firm* — David D. Brush; Westman, Champlin & Koehler, P.A.

(57) ABSTRACT

A method for receiving a signal during an intrabody communication via a user carrying a terminal. The method is performed by the terminal and includes: receiving a signal from a communication device, indicating that the user moved closer to the device between two instants; detecting, in the signal received, a first radio frame generated between the two instants, the first frame being at the same frequency as that of the signal received; detecting, in the signal received, a second radio frame generated between the two instants, the second frame being at a different frequency to that of the signal received; comparing the first frame to the second frame; and validating a transaction based on the presence or absence of information common to the first and second compared frames.

15 Claims, 4 Drawing Sheets

(56) References Cited

U.S. PATENT DOCUMENTS

| | | | |
|---|---|---|---|
| 2004/0152440 A1 | 8/2004 | Yoda et al. | |
| 2017/0346574 A1* | 11/2017 | Sato | H04B 13/00 |
| 2018/0351604 A1 | 12/2018 | Levionnais et al. | |
| 2020/0064996 A1* | 2/2020 | Giusti | G01S 13/88 |
| 2020/0295847 A1 | 9/2020 | Levionnais et al. | |

FOREIGN PATENT DOCUMENTS

| | | | |
|---|---|---|---|
| WO | 2017093639 A1 | 6/2017 | |
| WO | 2019063902 A1 | 4/2019 | |

OTHER PUBLICATIONS

Written Opinion of the International Searching Authority dated Jan. 13, 2021 for corresponding International Application No. PCT/FR2020/051747, filed Oct. 6, 2020.
English translation of the Written Opinion of the International Searching Authority dated Jan. 29, 2021 for corresponding International Application No. PCT/FR2020/051747, filed Oct. 6, 2020.
Non-Final Rejection for U.S. Appl. No. 17/770,852, mailed Feb. 15, 2023.
Final Rejection for U.S. Appl. No. 17/770,852, mailed Jul. 24, 2023.
Requirement for Restriction-Election for U.S. Appl. No. 17/770,852, mailed Dec. 6, 2022.

* cited by examiner

METHOD FOR VALIDATING A TRANSACTION DURING A RADIO COMMUNICATION

CROSS-REFERENCE TO RELATED APPLICATIONS

This application is a division of U.S. application Ser. No. 17/770,852, filed Apr. 21, 2022, which is a Section 371 National Stage Application of International Application No. PCT/FR2020/051747, filed Oct. 6, 2020, and published as WO 2021/079039 A1 on Apr. 29, 2021, not in English, the entire contents of which are incorporated herein by reference in their entireties.

FIELD OF THE INVENTION

The invention relates to short-range wireless communications for transmitting data between two devices by way of the human body. More precisely, the invention relates to a system for conducting transactions between a terminal carried by a user and a communication device such as a base station or a reader, connected for example to a transaction server, using the conductive capability of the human body to transmit the electromagnetic waves carrying such wireless communications.

PRIOR ART

Near-field communications, usually known by the acronym "NFC", based mainly on the ISO (International Organization for Standardization) 14443 standard, use wireless technologies to allow information to be exchanged between two peripherals separated by a short distance, typically less than ten centimeters. Communications of this type have many applications, for example in the fields of payment or transportation. The near-field receiver receives a message from the near-field transmitter. Such a message may correspond, in the abovementioned context, to the validation of a transaction, such as for example the exchange of a ticket (for an event, for travel, etc.), a payment, the launch of a personalized service on a computer or a television set, access to a room, etc.

The prior art discloses a system for exchanging such messages, in which the receiver is contained in a terminal carried by a user, the messages being received by the receiver during an intra-body communication via the user of the terminal. An intra-body communication uses the conductive capability of the human body to transmit the electromagnetic waves carrying wireless communications. Such a technology is called intra-body communication (IBC).

Such a wireless communication system is described for example in document WO2012/131224. The system comprises a terminal carried by a user, the antenna of which is in direct contact with, or very close to, the user. A signal transmitted by the terminal is modulated by way of a low-frequency modulator and transmitted through the body of the user. Indeed, it is known that the human body has conduction capabilities that are suitable for conveying such electromagnetic signals, provided that the antenna is located close to (less than a few centimeters from) the body of the user and designed so as to meet the expected objective. To this end, the antenna consists of a set of turns of a number and arrangement that are appropriate for transmitting the wave through the human body in an optimum manner. This system according to the prior art also comprises an NFC communication device comprising a receiver that comprises a sensitive surface consisting of an antenna of the same type as that of the transmitter and on which the user is able to perform an approach gesture, for example place his hand on the antenna, touch it or simply bring his hand toward the antenna to within a few centimeters thereof. The NFC communication device receives the signal due to the physical contact between, or at least the proximity of, the user and the antenna. The received signal is demodulated and transmitted to an equipment suitable for performing processing operations, in the present case for carrying out the transaction (payment, opening a door, etc.).

In order to secure this type of transaction, document WO2016/001506 proposes to detect and validate an intentional approach gesture performed by the user, in order to ensure that the approach gesture is actually performed. The drawback of such a system lies in the fact that, in the presence of multiple communication devices located close to the terminal of the user, even if the user performs an intentional approach gesture with respect to a first communication device, but not with respect to a second communication device, the transaction may fail if the signal received by the terminal of the user through intra-body communication, from the second communication device, has a power higher than that of the signal characterizing the intentional approach gesture performed by the user, received through intra-body communication from the first device.

Indeed, it is the frame contained in the signal transmitted by this second communication device that will be decoded by the terminal of the user, and not the data frame contained in the less powerful signal characterizing the approach gesture performed by the user, as transmitted by the first communication device.

The terminal of the user will thus be able, via a dedicated application, to detect the intentional approach gesture performed by the user with respect to the first communication device, by analyzing the evolution of the envelope of the received NFC signal, but risks incorrectly associating this envelope with an approach of the second communication device in connection with the decoding of the frames received therefrom.

The transaction between the terminal and the first communication device may therefore be unsuccessful.

AIM AND SUMMARY OF THE INVENTION

One of the aims of the invention is to rectify drawbacks of the abovementioned prior art.

To this end, one subject of the present invention relates to a method for receiving a signal during an intra-body communication via a user carrying a terminal, comprising the following, at the level of the terminal:
  receiving, from a communication device, a signal characterizing the fact that the user has performed an approach gesture toward the device between two times,
  detecting, in the received signal, a first radio data frame generated between the two times, said first frame being at the same frequency as that of the received signal.

Such a method is noteworthy in that it comprises the following, at the level of the terminal:
  detecting, in the received signal, a second radio data frame generated between the two times, said second frame being at a frequency different from that of the received signal,
  comparing the first frame with the second frame,
  validating a transaction depending on the presence or absence of information common to the compared first and second frames.

Such a reception method according to the invention allows the terminal carried by the user to establish a correlation between the first radio frame of the received signal, characterizing the fact that an approach gesture performed by the user toward the device has been performed between two times, and the received second radio frame at a frequency different from this signal, in order to deduce therefrom that validation information for validating the transaction to be established is communicated thereto by the device in connection with the approach gesture.

The reception method according to the invention thus allows the terminal carried by the user to check, from among the data frames that it receives via the intra-body communication, from multiple communication devices located close to the terminal, whether or not one of these devices has been approached (or even touched) by the user in order to conduct a transaction, and to validate a transaction, via the communication device that the user has actually approached or touched, by determining at least one item of information common to the first and second frames or else, on the contrary, to decline the transaction if the terminal does not determine any common information between the first and second frames.

The invention thus very easily makes it possible, by modifying a conventional signal characterizing the fact that the user has performed an approach gesture, by adding the second radio data frame, to check, by way of a terminal carried by the user, which device is the one that has actually been approached or touched by the user of the terminal to carry out a transaction. Furthermore, by correlating this common information that is temporally close to the time interval between the two times and that characterizes the fact that the user has approached or touched the device, the terminal is able to recognize, with a high probability, which device, from among the communication devices located close to the terminal, is the communication device via which a transaction should be established.

Intra-body communication is understood to mean a communication that uses the conductive capability of the human body to transmit the electromagnetic waves carrying wireless communications. Such technology is called IBC.

According to one particular embodiment, said at least one item of information common to the first and second frames is an identifier or location information for locating the communication device.

By virtue of the fact that the first and second radio frames containing the common information were generated in parallel between the two times corresponding to the time interval during which the user approached or touched a communication device, the terminal is able to correlate, very easily and without requiring complex computing resources, the identity or the location of the device that has actually been approached or touched.

According to another particular embodiment, the common information is represented in binary form.

Representing the information determining whether or not the user has approached or touched the device in binary form makes it possible to reduce the signaling cost of the transmission of the radio data frames between the communication device and the terminal.

According to another particular embodiment, the second frame is detected multiple times between the two times.

Such a provision allows the terminal to implement multiple comparisons between a first radio frame and a second radio frame, so as to distinguish, with the best possible probability, which device is the one that has actually been touched or approached by the user.

According to another particular embodiment, the second frame is detected once between the two times and is representative of the fact that the user has touched the communication device between the two times.

Such a provision corresponds to an embodiment in which the user has to touch the communication device to carry out a transaction, and not simply approach the device. The various abovementioned embodiments or implementation features may be added, independently or in combination with one another, to the reception method defined above.

The invention also relates to a terminal having capabilities for intra-body communication via a user carrying said terminal, said terminal comprising a processor that is configured so as to implement the following:
  receive, from a communication device, a signal characterizing the fact that the user has performed an approach gesture toward the device, between two times,
  detect, in the received signal, a first radio data frame generated between the two times, said first frame being at the same frequency as that of the received signal. Such a terminal is noteworthy in that the processor is configured so as to implement the following:
  detect, in the received signal, a second radio data frame generated between the two times, said second frame being at a frequency different from that of the received signal,
  compare the first frame with the second frame,
  validate a transaction depending on the presence or absence of information common to the compared first and second frames.

Such a communication terminal is in particular able to implement the abovementioned reception method.

The invention also relates to a method for transmitting a signal during an intra-body communication via a user carrying a terminal, comprising the following, at the level of a communication device:
  detecting an approach gesture performed by the user toward the communication device, said gesture being performed between two times,
  transmitting, to the terminal, a signal characterizing the approach gesture, said signal containing a first radio data frame generated between the two times, said first frame being at the same frequency as that of the transmitted signal.

Such a transmission method is noteworthy in that the transmitted signal furthermore comprises a second radio data frame generated between the two times, the second frame being at a frequency different from that of the transmitted signal.

According to one particular embodiment, said at least one item of information common to the first and second frames is an identifier or location information for locating the communication device.

According to another particular embodiment, the common information is represented in binary form.

According to another particular embodiment, the second frame is generated multiple times between the two times.

According to another particular embodiment, the second frame is generated once between the two times and is representative of the fact that the user has touched the communication device between the two times.

The various abovementioned embodiments or implementation features may be added, independently or in combination with one another, to the transmission method defined above.

The invention also relates to a communication device having capabilities for signal transmission during an intrabody communication via a user carrying a terminal, said device comprising a processor that is configured so as to implement the following:
- detect an approach gesture performed by the user toward the communication device, said gesture being performed between two times,
- transmit, to the terminal, a signal characterizing the approach gesture, said signal containing a first radio data frame generated between the two times, said first frame being at the same frequency as that of the transmitted signal.

Such a device is noteworthy in that the transmitted signal furthermore comprises a second radio data frame generated between the two times, the second frame being at a frequency different from that of the transmitted signal.

Such a device is in particular able to implement the abovementioned transmission method.

The invention also relates to a computer program comprising instructions for implementing the reception or transmission method according to the invention according to any one of the particular embodiments described above when said program is executed by a processor.

Such instructions may be stored durably in a non-transitory memory medium of the communication terminal implementing the reception method or of the communication device implementing the transmission method.

This program may use any programming language and be in the form of source code, object code or intermediate code between source code and object code, such as in a partially compiled form, or in any other desirable form.

The invention also targets a computer-readable recording medium or information medium comprising instructions of a computer program as mentioned above.

The recording medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from an Internet-type network.

As an alternative, the recording medium may be an integrated circuit in which the program is incorporated, the circuit being designed to execute or to be used in the execution of the abovementioned reception or transmission method.

BRIEF DESCRIPTION OF THE DRAWINGS

Other features and advantages will become apparent from reading particular embodiments of the invention, which are given by way of illustrative and non-limiting examples, and the appended drawings, in which.

DETAILED DESCRIPTION OF ONE EMBODIMENT OF THE INVENTION

Figure 1:
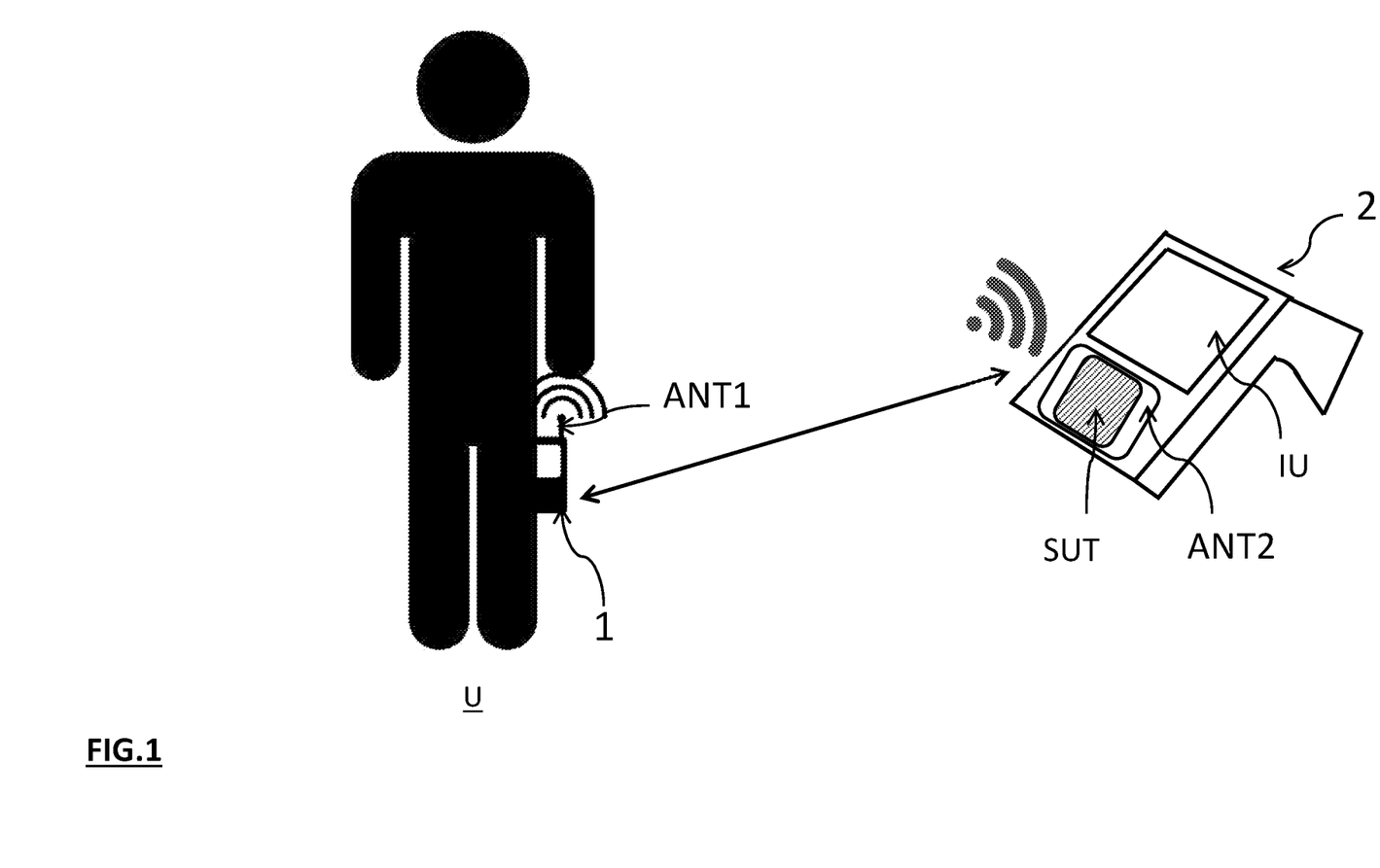
FIG. 1 shows a communication system according to one embodiment of the invention when a terminal carried by a user conducts a transaction with a communication device, in one particular embodiment of the invention.

FIG. 1 shows a wireless communication system according to one embodiment of the invention.

Such a system comprises:
- a terminal 1 carried by a user U, the terminal 1 being equipped with an NFC-IBC module (not shown) and an IBC antenna denoted by the reference ANT1,
- a communication device 2, such as for example a base station, or terminal, equipped with an NFC module.

The terminal 1 according to the invention is suitable for transmitting and receiving radio signals, which are also called radio carrier waves, via the antenna ANT1, through the body of a user U. To this end, the terminal 1 is located close to the user U, without necessarily being in direct contact therewith. For example, the terminal 1 is placed inside a pocket or a bag carried against the user. In these configurations, it is estimated that the terminal 1 is not more than a few centimeters away from the body of the user U. The distance is for example less than 10 cm. The terminal 1 is equipped with a battery or battery cells for autonomous operation. It is for example a mobile telephone equipped with an NFC antenna used as antenna for transmitting and receiving modulated or unmodulated electrical signals. In the context of this exemplary embodiment, and as already explained previously, the NFC antenna ANT1 is also IBC. To this end, the antenna ANT1 is designed so as to receive the electromagnetic wave through the human body in an optimum manner. For this purpose, it consists of a set of turns of an appropriate number and arrangement.

The terminal 1 may of course take other forms. For example, it may be any portable device capable of near-field communication with NFC transmitters, directly or via the human body (bracelet, electronic tablet, necklace, etc.).

The communication device 2 is an equipment that is able to transmit and receive radio signals, or carrier waves, in particular through the body of the user U, via an IBC antenna, denoted by the reference ANT2. In this exemplary embodiment, the communication device 2 is a reader that comprises a sensitive surface formed by the antenna ANT2, which is possibly protected and designed to react when the user approaches a few centimeters from the antenna ANT2, for example by placing his hand above the antenna ANT2. Thus, when the user U approaches the antenna ANT2, with his hand for example, a modulated electrical signal transmitted or received via the antenna ANT2 is able to be conveyed by the body of the user U. The antenna ANT2 may furthermore comprise a sensitive surface SUT, shown in dotted lines in FIG. 2, which is designed to react when the user touches it, for example by placing his hand on it. Thus, when the user U touches the sensitive surface SUT, with his hand for example, a modulated electrical signal transmitted or received via the antenna ANT2 is able to be conveyed by the body of the user U. According to one exemplary embodiment, the sensitive surface SUT may be equipped with one or more capacitive detectors (not shown). Other touch detection technologies may of course be implemented, such as for example surface wave technology, infrared technology, etc. The communication device 2 also comprises a user interface (also called HMI), referenced IU, intended to display messages for the attention of the user and an equipment (not shown in FIG. 1) able to perform processing operations, such as a PC or a server. The antenna ANT2 (if an approach is sufficient) or else the sensitive surface SUT covering the antenna ANT2 (if a touch is required), the user interface IU and the equipment are connected for example by way of a wired link, or through a network, for example a mobile network, or the Internet. The communication device 2 is configured so as to operate in IBC mode by loading a specific (software) program, without modifying the hardware.

According to one alternative embodiment, the communication device 2 consists of an electronic shelf label (ESL) that the user touches in order to receive personalized product information (discount, benefit, promotion, information about the product, etc.).

Description of One Embodiment of the Terminal 1

Figure 2:
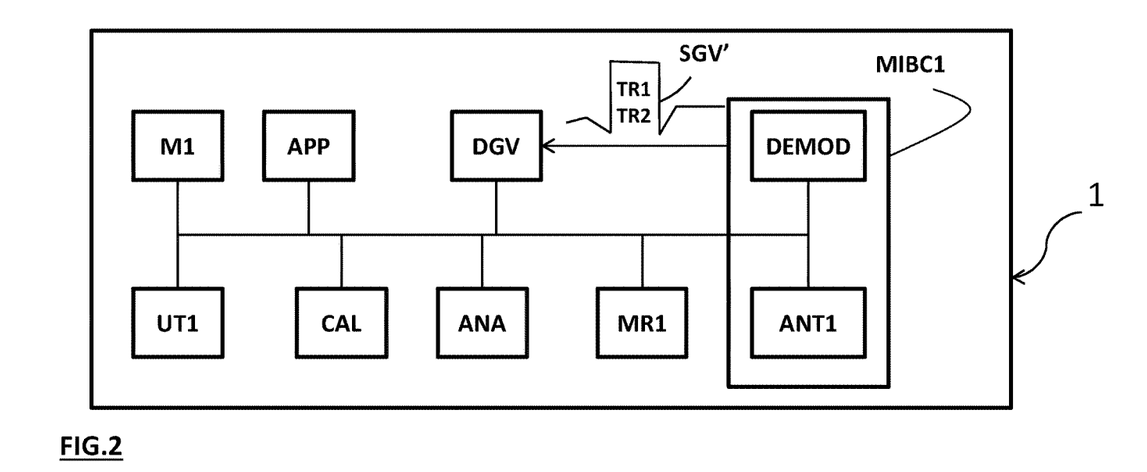
FIG. 2 shows a terminal in one particular embodiment of the invention.

FIG. 2 shows the simplified structure of the terminal 1 designed to implement the signal reception method that will be described below.

The terminal 1 is for example a smartphone mobile terminal designed to implement the invention. According to another example, the terminal is a simple electronic card equipped with the following modules:
- a processing unit, such as a processor or "CPU" (for "Central Processing Unit"), referenced UT1, intended to load instructions into memory, to execute them and to perform operations,
- a set M1 of memories, including a volatile memory, or "RAM" (for "Random Access Memory") used to execute code instructions, store variables, etc., and including a non-volatile memory such as a "ROM" ("Read Only Memory") or "EEPROM" (for "Electrically Erasable Programmable Read Only Memory") intended to contain persistent information, in particular the identification data for identifying the user UT,
- an IBC module, referenced MIBC1, including:
  - an antenna ANT1 designed in particular to receive signals over the radio channel and via the human body, such that a modulated electrical signal transported by the body of the user is able to be received by the antenna, which is located in the terminal, close to the human body;
  - a demodulator DEMOD, intended to receive, via the antenna ANT1, a modulated electrical signal and to transform it into a digital signal intended to be transmitted to the processing unit;
  - the software components (firmware, etc.) required to implement IBC communications;
- a Bluetooth or Wi-Fi radio module MR1 intended to transmit in particular data back from the terminal 1 to the device 2 or any other appropriate device,
- preferably, and in particular if the following modules are not implemented on another device:
  - an intentional gesture detection module, referenced DGV, for analyzing the signals received by the module MIBC1 and deciding whether or not they involve a signal SGV' corresponding to a movement comprising an intentional gesture performed by the user U and modified according to the invention;
  - an analysis module ANA for analyzing any signal received from the communication device 2, in particular following an intentional movement performed by the user, and detecting, in a time interval in which the amplitude of the received signal is at a maximum, whether the received signal comprises a received first radio data frame at the same frequency as the received signal and a received second radio data frame at a frequency different from that of the first frame;
  - a computing module CAL for comparing the first frame to the second frame in order to detect the presence or absence of information common to the first and second frames;
  - an application module APP for validating or not validating, depending on the presence or absence of this common information, the appropriate transaction required by the terminal 1, either with the device 2, or with any other appropriate device/equipment.

Description of One Embodiment of the Communication Device 2

Figure 3:
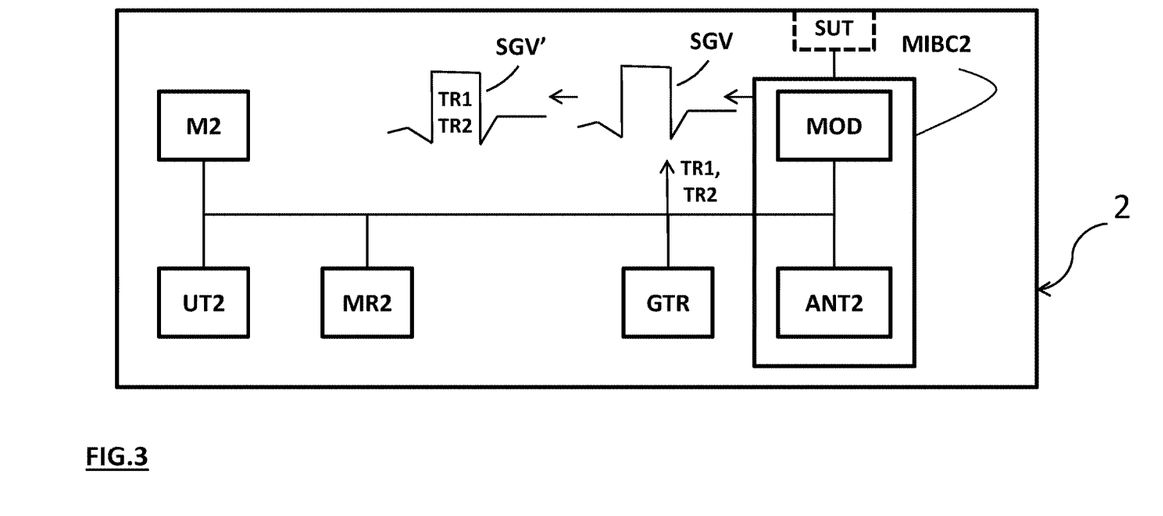
FIG. 3 shows a communication device in one particular embodiment of the invention.

FIG. 3 shows the simplified structure of the communication device 2 designed to implement the signal transmission method that will be described below. The device 2 comprises multiple modules that are similar to those of the terminal 1 described with reference to FIG. 2:
- a processing unit, such as a processor or CPU, referenced UT2, used to execute code instructions, store variables, etc.,
- a set M2 of memories, including a volatile memory or "RAM" (for "Random Access Memory") used to execute code instructions, store variables, etc., and a non-volatile memory, such as a "ROM" or "EEPROM" intended to contain persistent information,
- an IBC module, referenced MIBC2, including:
  - an antenna ANT2 designed in particular to transmit/receive signals over the radio channel and via the human body and to react to an approach gesture performed by the user U, for example by bringing his hand just above the antenna ANT2, said antenna ANT2 being arranged so as to interact with the processing unit UT2 in order to implement the steps of the signal transmission method that will be described later on;
  - a modulator MOD intended to adapt a digital signal produced by the processing unit UT2 into a modulated electrical signal, intended to be transmitted, via the antenna ANT2, through the body of the user. The modulation operation performed by the modulator is for example an amplitude modulation: the signal is a signal with a frequency of for example 13.56 MHz, amplitude-modulated with a modulation rate of approximately 10% (known characteristic of Type B according to the NFC standard). The invention is however not limited to this type of modulation. In another exemplary embodiment, the modulation is a frequency modulation, which is less sensitive to interference, or a phase modulation;
- if the approach gesture is a touch, a touch surface SUT designed to react when the user U touches it (contact, touch, tap, etc.). In the example described here, this surface corresponds to the antenna, such that a modulated electrical signal transmitted via the antenna ANT2 is able to be conveyed by the body of the user who touches the surface SUT. In one exemplary embodiment, the antenna may be integrated into the surface. The surface is designed so as to interact with the processing unit UT2 in order to implement the steps of the signal transmission method that will be described later on;

a Bluetooth or Wi-Fi radio module MR2 intended in particular to receive data in return from the terminal 1 (signals received by the terminal 1, data relating to the transaction, etc.) and/or to enter into contact with another device in order to validate the transaction (door, connected object, etc.), the software components (firmware, etc.) required to implement IBC communications, optionally a user interface (HMI) designed to transmit instructions or information messages to the user U. For example, the user interface is a screen on which the messages and instructions are displayed. In another exemplary embodiment, the interface is an audio interface for playing the messages and instructions, for example for telling the user that he may remove his hand from the surface. The interface may also comprise a keypad, a microphone, etc.

and in particular if the following modules are not present on another device, a frame generation module GTR for generating a first radio data frame TR1 at the same frequency as the modulated signal and a second radio data frame TR2 at a frequency different from that of the first frame, providing a signal SGV' corresponding to a movement comprising an intentional gesture performed by the user U as modified according to the invention.

It will be recalled that any off-the-shelf reader (for example an EPT for "electronic payment terminal") may advantageously be used as communication device 2, provided that it benefits from the module MIBC2 and possibly has a touch surface if the transaction requires touching the device 2, and after a simple update of the software of the reader (installation and/or update of the application and configuration of the NFC transmission) to give it the ability to transmit a message having the IBC characteristics (frequency, modulation, etc.) via its antenna.

Figure 4:
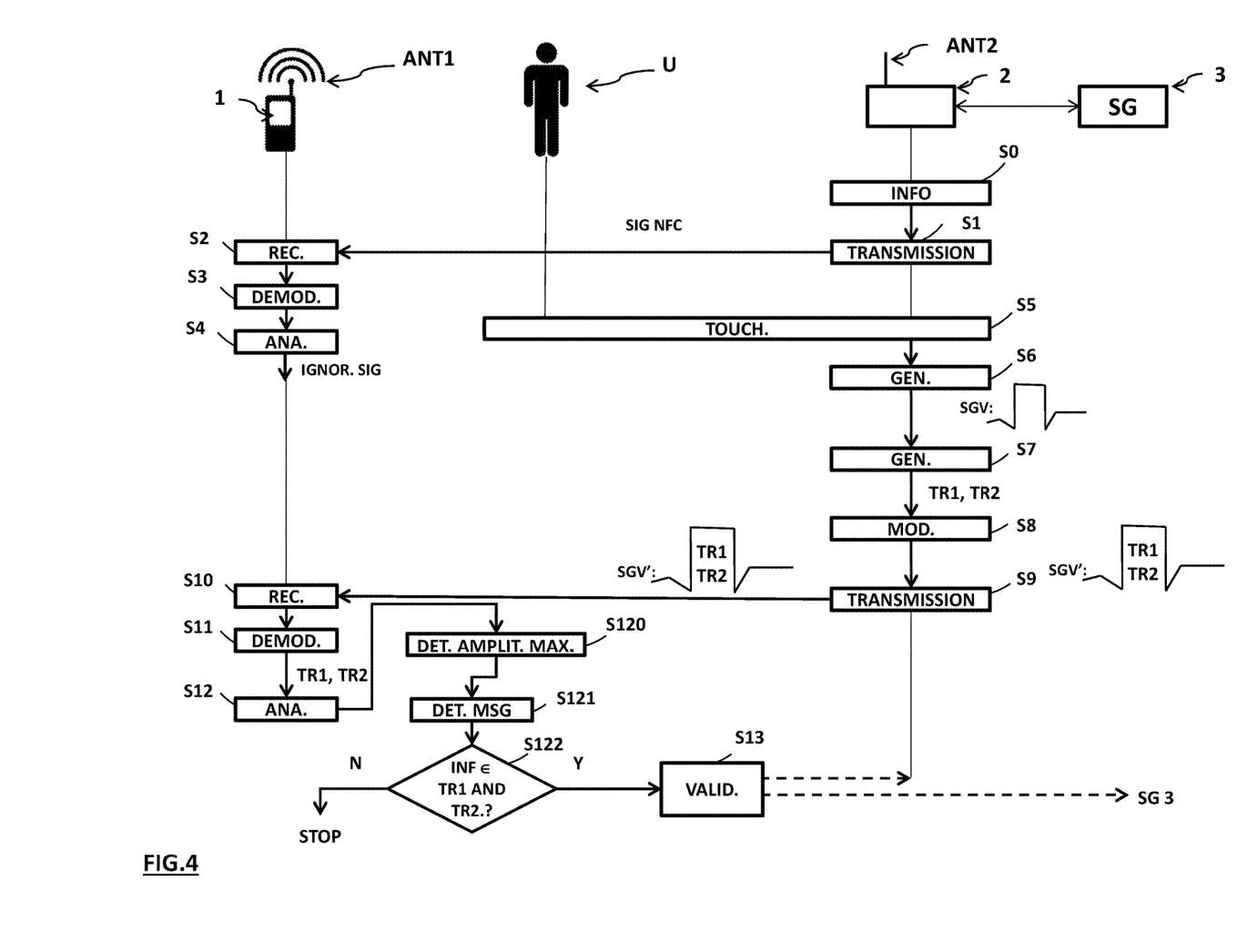
FIG. 4 shows the main actions implemented in the signal transmission/reception method, according to one particular embodiment of the invention.

Description of One Embodiment of a Bidirectional Wireless Intra-Body Communication Method With reference to FIG. 4, a description is now given of the sequence of a bidirectional wireless communication method through the human body of a user U, between the abovementioned terminal 1 and the abovementioned communication device 2, according to one embodiment of the invention.

In an initial step S0, in response to the approach of the user U toward the device 2, the device 2 renders information to the user U. According to one particular embodiment, this may be an information message, such as for example: "to validate the amount of the transaction, please bring your hand toward the antenna ANT2/touch the touch surface SUT", "to validate access to the library, please bring your hand toward the antenna ANT2/touch the touch surface SUT", etc. Such an information message may be rendered in text form and/or vocally.

The method then proceeds as follows:

In S1, the device 2 transmits, via its antenna ANT2, an NFC-type modulated electrical signal associated with a search message intended for a device located close to the device 2, in this case the terminal 1 carried by the user U. Such a signal, denoted by the reference SIG in FIG. 4, conventionally contains a default data frame along with a payload containing for example a random number, a code, a key, etc. This frame constitutes a search message transmitted in the signal SIG transmitted by the device 2, which is intended, according to this example, to come into contact with a portable device located close to the device 2. It is specific to the proposed transaction service: payment, access to a room, etc.

The signal SIG may be transmitted continuously for a predefined duration.

At the end of this transmission duration, the device 2 changes to reception mode.

In S2, the signal SIG transmitted in S1 is detected and received by the terminal 1.

In S3, the terminal 1 demodulates the received signal SIG into a digital signal.

In S4, the terminal 1 analyzes the digital signal thus obtained, via the module ANA of FIG. 2. During this analysis, the terminal 1 detects at least one of the information elements corresponding to the interrogation of the device 2, specifically, in this example, a service using IBC technology. Since the application APP does not at this stage detect any information relating to an intentional gesture performed by the user U with respect to the device 2, the signal SIG is ignored by the terminal 1.

The method according to the invention then proceeds as follows:

In S5, the user U touches the sensitive surface SUT of the device 2, for example by placing his hand thereon, or else approaches the antenna ANT2 of the device 2, for example using his hand.

In S6, the device 2 generates an electrical signal SGV representative of the intentional gesture performed by the user U.

Figure 5:
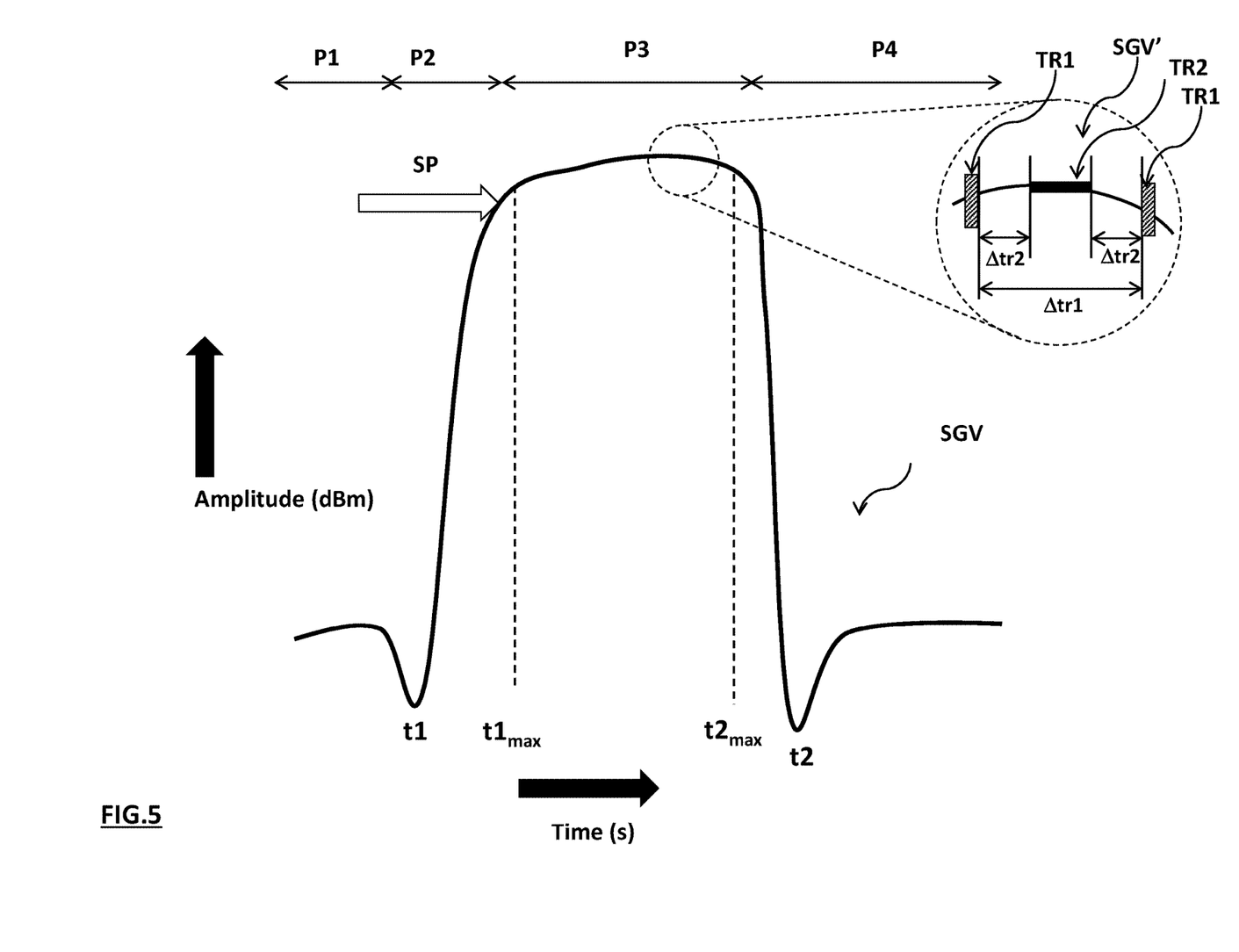
FIG. 5 shows one embodiment of a signal representative of an approach gesture performed by a user toward a communication device according to the invention.

In FIG. 5, the signal SGV comprises:

a first portion P1, characterizing the fact that the user U has not yet approached the antenna ANT2/touched the touch surface SUT of the device 2. To this end, the power or the amplitude of the signal SGV is low, for example of the order of −70 dB;

a second portion P2, characterizing the fact that the user U has approached the antenna ANT2/touched the touch surface SUT of the device 2. To this end, the signal SGV increases sharply until it reaches an amplitude of the order of for example −50 dB, at a time $t1_{max}$;

a third portion P3, characterizing the duration for which the user U keeps his hand above the antenna ANT2/ remains in contact with the touch surface SUT of the device 2. To this end, the signal SGV reaches a maximum amplitude of the order of −50 dB until a time $t2_{max}$;

a fourth portion P4, characterizing the fact that, at $t2_{max}$, the user U has moved his hand away from the device 2. To this end, the signal SGV decreases sharply until it reaches an amplitude of the order of −70 dB.

With reference again to FIG. 4, if there has been an approach or touch, the module GTR of the device 2 generates, in S7:

a first radio data frame TR1 for validating the gesture performed by the user U, which comprises information INF characterizing for example the device 2, a second radio data frame TR2 for validating the gesture performed by the user U, which comprises the information INF.

Other information may be contained in the data frame TR1, such as for example a service identifier and/or else a random datum.

By way of non-exhaustive example, such information INF is coded on one or more bits. Of course, the information INF could be in text form, in alphanumeric form, etc. According to one exemplary embodiment, the information INF is an identifier of the device 2. As an alternative, the information INF is a location address (GPS coordinates, URL address, etc.) for locating the device 2.

Other information may be contained in the data frame TR1, such as for example a service identifier and/or else a random datum.

If there has not been an approach or touch, the module GTR of the device 2 generates, in S7:
- the first radio data frame TR1 for validating the gesture performed by the user U, which has been described above,
- a second radio data frame TR2 for not validating the gesture performed by the user U, which comprises information INF' different from the information INF, for example information INF' containing an error code on for example one or more bits.

Of course, the information INF' could be in text form, in alphanumeric form, etc.

In S8, the device 2, via its module MOD (FIG. 3), modulates the signal SGV by associating the frames TR1 and TR2 therewith, between the times $t1_{max}$ and $t2_{max}$, providing a signal SGV'.

In S9, the device 2, via its antenna ANT2, transmits a modulated electrical signal SGV' for validating or not validating the gesture performed by the user U, intended for the terminal 1 carried by the user U, said signal being associated, between the times $t1_{max}$ and $t2_{max}$, with the first and second frames TR1 and TR2 generated in S7. The frame TR1 is transmitted at the same frequency as that of the signal SGV', that is to say for example 13.56 MHz, while the frame TR2 is transmitted at a frequency different from that of the signal SGV'. Such a different frequency is for example of the order of a few kHz, for example 5 kHz.

According to one embodiment, a single frame TR2 is transmitted between the times $t1_{max}$ and $t2_{max}$, following a frame TR1.

As an alternative, as shown in FIG. 5, a single frame TR2 is transmitted between two frames TR1, in the time interval $t1_{max}$, $t2_{max}$. In the example shown, the two frames TR1 are separated by a time interval $\Delta tr1$ equal for example to 10 ms, while the frame TR2 is spaced apart from two successive frames TR1, by the same time interval $\Delta tr2$, equal for example to 6.2 μs. A single frame TR2 is transmitted for example if the device 2 is equipped with the touch surface SUT, when the user U touches the surface SUT of the device 2.

According to another embodiment, between the times $t1_{max}$ and $t2_{max}$, the frame TR2 may be sent continuously, just like the frame TR1, whether or not the device 2 is equipped with a touch surface SUT.

In S10, the modulated electrical signal SGV' transmitted in S9 is detected and received by the terminal 1, via the body of the user U, passing through the antenna ANT1.

In S11, the terminal 1 demodulates the received electrical signal SGV' into a digital signal, via its module DEMOD (FIG. 2). To this end, the terminal 1 demodulates the modulated electrical signal SGV' at the frequency 13.56 MHz into the first data frame TR1. Also in S10, the terminal 1 demodulates the modulated electrical signal SGV' at the frequency 5 kHz into the second data frame TR2.

In S12, the terminal 1 analyzes the digital signal thus obtained, via its module DGV (FIG. 2), in order to validate whether or not the gesture performed by the user U corresponds to an intentional gesture on the part thereof and whether or not the antenna ANT2 of the device 2 has been approached by the user U or else whether or not the touch surface SUT of the device 2 has been touched by the user U, if the device 2 is equipped with such a surface.

During this analysis, the terminal 1 detects, in S120, that the amplitude of the signal SGV' is at a maximum between the times $t1_{max}$ and $t2_{max}$ and that the signal SGV' has exceeded a predetermined threshold SP between these two times. A first condition according to which the signal SGV' is representative of an approach gesture performed by the user U toward the device 2 is therefore met.

In S121, based on the first frame TR1, the terminal 1 detects the information INF, and possibly the other above-mentioned information, such as for example a service identifier and/or else a random datum. Also in S121, or in a step simultaneous to S121, based on the second frame TR2, the terminal 1 detects the information INF or the information INF' mentioned above.

In S123, the terminal 1 compares the frames TR1 and TR2, via the module CAL of FIG. 2.

If the information INF is present both in the frame TR1 and in the frame TR2, the additional condition for validating the intentional approach gesture performed by the user U is met. The terminal 1 may thus advantageously check whether or not the frame TR2 resulting from the overmodulation of the envelope of the signal SGV' received in S9 is associated with the content of the received frame TR1.

In S13, the terminal 1 then validates the content of the frame TR1 in a conventional manner, and then enters into communication either with the device 2 if the latter has sufficient management capabilities or else with the management system SG3 or any other appropriate management equipment, in order to activate the service required by the terminal 1 (validate the amount of a transaction, validate access to a room, validate a balance of transport tickets, etc.).

If the information INF is present only in the frame TR1, the additional condition for validating the intentional approach gesture performed by the user U is not met. The terminal 1 therefore does not continue the transaction.

The invention claimed is:

1. A transmission method for transmitting a signal during an intra-body communication via a user carrying a terminal, comprising the following, performed by a communication device:
   - detecting an approach gesture performed by the user toward the communication device, the approach gesture being performed between first and second time instants; and
   - transmitting the signal to the terminal, the signal characterizing that the user has performed the approach gesture toward the device, the signal containing a first radio data frame generated between the first and second time instants, the first radio data frame being at a same frequency as that of the signal,
   - wherein the signal furthermore comprises a second radio data frame generated between the first and second time instants, the second radio data frame being at a frequency different from that of the signal,
   - the first and second radio data frames containing at least one item of information common or not.

2. The transmission method as claimed in claim 1, wherein the at least one item of information common or not to the first and second radio data frames is an identifier or location information for locating the communication device.

3. The transmission method as claimed in claim 1, wherein the at least one item of information common or not to the first and second radio data frames is represented in binary form.

4. The transmission method as claimed in claim 1, wherein the second radio data frame is generated multiple times between the first and second time instants.

5. The transmission method as claimed in claim 1, wherein the second radio data frame is generated once between the first and second time instants and represents that the user has touched the communication device between the first and second time instants.

6. A communication device having capabilities for transmitting a signal during an intra-body communication via a user carrying a terminal, the device comprising:
- a processor that is configured so as to:
- detect an approach gesture performed by the user toward the communication device, the approach gesture being performed between first and second time instants; and
- transmit the signal to the terminal, the signal characterizing that the user has performed the approach gesture toward the device, the signal containing a first radio data frame generated between the first and second time instants, the first radio data frame being at a same frequency as that of the signal,
- wherein the signal furthermore comprises a second radio data frame generated between the first and second time instants, the second radio data frame being at a frequency different from that of the signal,
- the first and second radio data frames containing at least one item of information common or not.

7. The communication device as claimed in claim 6, wherein the at least one item of information common or not to the first and second radio data frames is an identifier or location information for locating the communication device.

8. The communication device as claimed in claim 6, wherein the at least one item of information common or not to the first and second radio data frames is represented in binary form.

9. The communication device as claimed in claim 6, wherein the second radio data frame is generated multiple times between the first and second time instants.

10. The communication device as claimed in claim 6, wherein the second radio data frame is generated once between the first and second time instants and represents that the user has touched the communication device between the first and second time instants.

11. A non-transitory computer-readable information medium comprising instructions of a computer program stored thereon, which when executed by a processor of a communication device, configure the communication device to perform a method for transmitting a signal during an intra-body communication via a user carrying a terminal, wherein the method comprises:
- detecting an approach gesture performed by the user toward the communication device, the approach gesture being performed between first and second time instants; and
- transmitting the signal to the terminal, the signal characterizing that the user has performed the approach gesture toward the device, the signal containing a first radio data frame generated between the first and second time instants, the first radio data frame being at a same frequency as that of the signal,
- wherein the signal furthermore comprises a second radio data frame generated between the first and second time instants, the second radio data frame being at a frequency different from that of the signal,
- the first and second radio data frames containing at least one item of information common or not.

12. The non-transitory computer-readable information medium as claimed in claim 11, wherein the at least one item of information common or not to the first and second radio data frames is an identifier or location information for locating the communication device.

13. The non-transitory computer-readable information medium as claimed in claim 11, wherein the at least one item of information common or not to the first and second radio data frames is represented in binary form.

14. The non-transitory computer-readable information medium as claimed in claim 11, wherein the second radio data frame is generated multiple times between the first and second time instants.

15. The non-transitory computer-readable information medium as claimed in claim 11, wherein the second radio data frame is generated once between the first and second time instants and represents that the user has touched the communication device between the first and second time instants.

* * * * *